Figure 1:
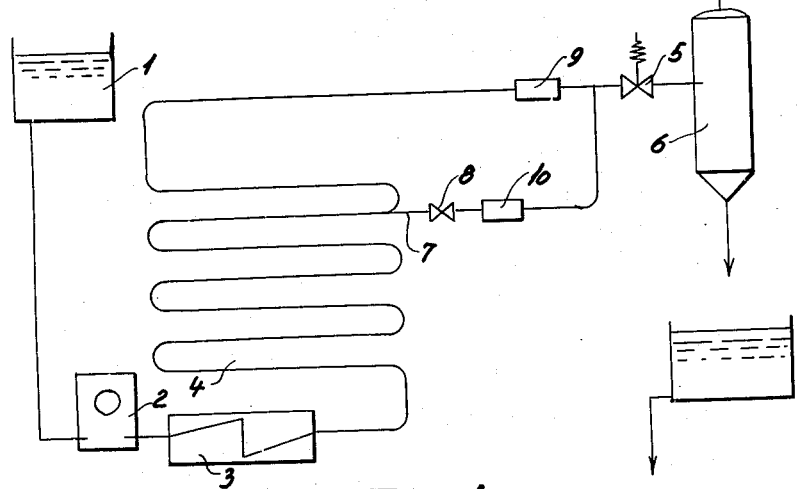

Sept. 27, 1960  K. K. K. KROYER  2,954,304
PROCESS AND APPARATUS FOR THE PRODUCTION OF STARCH SYRUP
Filed July 5, 1957  3 Sheets-Sheet 1

INVENTOR
Karl K. K. Kroyer

BY
Watson, Cole, Grindle & Watson
ATTORNEYS

Sept. 27, 1960  K. K. K. KROYER  2,954,304
PROCESS AND APPARATUS FOR THE PRODUCTION OF STARCH SYRUP
Filed July 5, 1957  3 Sheets-Sheet 3

INVENTOR
Karl K. K. Kroyer

BY
Watson, Cole, Grindle & Watson
ATTORNEYS

2,954,304

PROCESS AND APPARATUS FOR THE PRODUCTION OF STARCH SYRUP

Karl Kristian Kobs Kroyer, 70, Aaboulevarden, Aarhus, Denmark

Filed July 5, 1957, Ser. No. 670,285

Claims priority, application Denmark July 11, 1956

2 Claims. (Cl. 127—23)

This invention relates to a process for the production of starch syrup by hydrolysis of acidified starch slurry.

For such hydrolysis the autoclave method is frequently adopted, the acidity of the starch slurry, the steam temperature as well as reaction time being controlled in such a manner as to ensure a product possessing a desired content of reducing sugars (i.e. a certain degree of sweetness). It appears that for no controllable reason—concerning a certain reducing sugar value—the viscosity of the resulting product varies to some extent. Presumably, the explanation is the fact that the reaction times of the various portions of the medium differ, and are—to some degree—left to chance, because some portions of the medium are subjected to different reaction conditions on account of uneven penetration of heat and uneven assimilation of acid during gelatinization and liquefaction, and also because of the different times of treatment caused by the filling and emptying of the autoclave. The result is an uncontrollable composition of the many different sizes of molecules composing the hydrocarbon in the starch syrup.

By the production of glucose according to the continuous method, i.e. in a tubular converter, a more constant viscosity at a predetermined content of reducing sugars is obtained of a predetermined concentration harmonizing well with the fact that, in this case, the various portions of the medium may be assumed to be subjected to far more even reaction conditions.

It is, of course, an advantage that starch syrup of a more constant viscosity is obtainable from a tubular converter, as thus the glucose producer as well as the glucose manufacturer are saved the trouble resulting from viscosity fluctuations, and likewise they are enabled to make their plans on the basis of a predetermined viscosity.

However, the viscosity obtained may not be the most advantageous one for all purposes. It may be desirable, for instance, to obtain different viscosities for transport reasons, e.g. delivery of starch syrup in tank trucks, or because of the mechanical manufacturing conditions in the production or application of the starch syrup. Thus, owing to the price conditions of sugar and syrup relatively, some factories may wish to use the smallest possible addition of starch syrup to the mixture of sucrose and still obtain a high viscosity of the mixture. Other factories may wish to add larger quantities of starch syrup without unduly increasing the viscosity of the mixture. Other factories again prefer to operate at a very high viscosity to decrease the absorption of humidity on the part of the resulting product. Also, for the sake of warranting a certain consistency of a certain ready-made product (such as candy, marmalade, etc.) incorporating syrup, it may be desirable to have a viscosity independent of sweetness, i.e. reducing sugars. There are circumstances, too, where a definite viscosity is wanted in combination with the highest possible sweetening capacity, or vice versa, a definite sweetening capacity (sweetness) in combination with the lowest possible viscosity. Speaking more generally: the advantage of the possibility of varying the degree of viscosity independent of the degree of sweetness.

One object of the present invention is to devise a process facilitating the production of starch syrup of a controllable viscosity at a certain degree of sweetness, i.e. a certain content of reducing sugars, or vice versa of a controllable degree of sweetness at a certain viscosity. To obtain this according to the invention, the reaction medium in a continuous tubular converter system is split into two or more parallel branch streams, which are subsequently recombined having been subjected each of them to controllable reaction conditions.

In this connection consideration is paid to the fact that in a tubular converter a continuously progressing conversion will take place facilitating that at different points of the tubular converter extractions may be made of a product at different degrees of conversion depending on the time, temperature, and acidity to which the product has been subjected on its way. Consequently, by mixing products of higher and lower degrees of conversion it proves possible through the spreading of the different sizes of molecules composing the product to control—to a certain limit in relation to the reducing sugar values—the viscosity.

According to the present invention one branch stream may be led through a tubular converter—thus being subjected to a reaction time in the entire length of same—while another branch stream may be branched off at a point before the discharge end of the tubular converter and will not be subjected to any further conversion before being combined with the first stream again when this has passed the remaining part of the tubular converter. In this case the different treatments of the two branch streams take place near the last part of the tubular converter. Alternatively, the different treatments may be arranged to take place near the first part of the tubular converter, viz. by subjecting a branch stream to pre-conversion during or after heating before combining it with another branch stream, which has not been subjected to a corresponding pre-conversion.

Other possibilities according to this invention are conceivable as long as the end product is obtained by the combination of two branch streams treated differently in a controllable manner.

The invention also relates to an apparatus for carrying out the process described. According to the invention, this apparatus comprises a continuous tubular converter having several flow paths for the reaction medium, said flow paths being each controllable as regards reaction conditions.

The following is a detailed description of the invention with references to the attached drawings.

Figures 1–5 give diagrammatic illustrations (flow sheets) of the five different ways of arranging the apparatus according to the present invention.

In Figure 1, item is a tank from which, by means of a pump 2, acidified starch slurry is pumped through a heat exchanger 3 into a converter coil 4. The heat exchanger 3 and the converter coil 4 combine to form a continuous tubular converter system. The discharge end of the converter coil 4 is connected over reducing valve 5 to a flash chamber 6. The converter coil has a tapping point 7 which by-passing the following part of the converter coil is connected through a check valve 8 to the discharge conduit from the discharge end of the converter coil on the pressure side of the reducing valve 5.

The system operates as follows:

In the converter coil 4 a progressive conversion takes place of the heated starch medium received from the heat exchanger 3. At the tapping point 7 the starch medium is branched into two branch streams, of which one proceeds through the remaining part of the converter, and from there through the reducing valve 5 to the flash chamber 6, whereas the second branch stream passes through the check valve 8 direct to the pressure side of the reducing valve 5. Here it is recombined with the first branch stream. The product discharged from the converter to the flash chamber 6 through the reducing valve is consequently a mixture of the two branch streams. Of these, one has passed through a longer part of the tubular converter than has the other one, and has therefore obtained a higher degree of conversion. Thus, the resulting product is a mixture of products converted to higher and lower degrees. At a certain content of reducing sugars and a certain concentration its viscosity will accordingly be higher than if the whole of the product had been extracted at the point of the converter where the medium possesses the said certain content of reducing sugars. The reason for this is that by mixing the two branch streams a greater proportion of larger molecules is obtained in a product having a certain content of reducing sugars. A tubular converter will have the greatest possibilities of viscosity variations when constructed and operated under such conditions as regards turbulence, starch concentration, acidity, temperature, pressure, etc., that when used without employment of the branching-off system the converter will deliver a final product having a viscosity lower than the one possibly required of the end product.

By adjusting the check valve 8 the ratio between the two branch streams and thereby the viscosity of the end product may be controlled. In order that a check may be kept on the ratio between the two branch streams, flow gauges or capacity meters 9 and 10 respectively should be inserted. The apparatus described is assumed to be of the fully continuous flow type in which the heat exchanger 3 is a continuous flow heat exchanger, whereas the pump 2 may be of the pulsating type, e.g. a diaphragm pump. The reducing valve 5 serves to maintain the pressure desired in the converter system. To control the ratio between the two branch streams it is sufficient to have a check valve in one of them, preferably as indicated in the branch stream by-passing the last part of the converter. If desired, however, check valves may also be provided in both branch streams.

Figure 2:
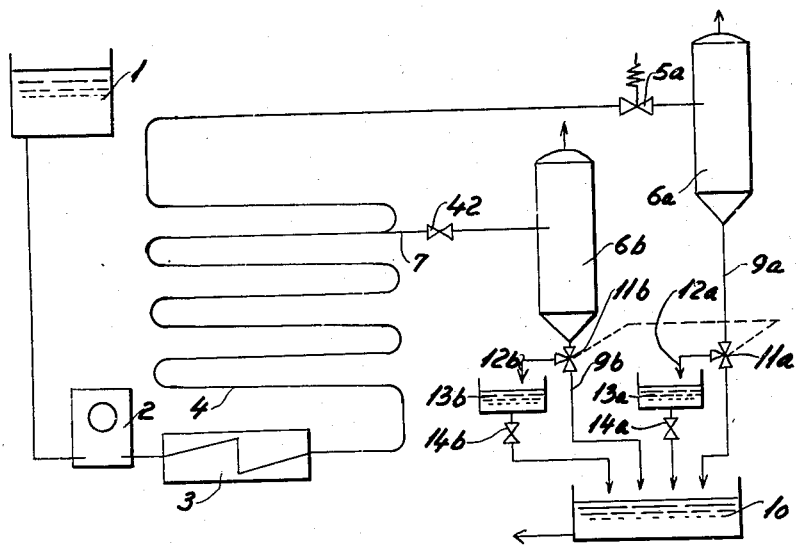

The apparatus illustrated in Figure 2 corresponds substantially to that of Figure 1, but differs from the latter in that the two branch streams from the discharge end of the converter and from the tapping point 7 respectively are not re-combined before flashing, but are connected to individual flash chambers 6a and 6b respectively through a reducing valve 5a and a check valve 42 respectively. From the flash chambers 6a and 6b discharge conduits 9a and 9b respectively extend to a joint collecting tank 10 in which the mixing of the two branch streams takes place. In each of the conduits 9a and 9b is provided a three-way valve 11a and 11b connected with an extraction conduit 12a and 12b leading to measuring vessels 13a and 13b respectively. By switching over to the extraction conduits 12a and 12b for a short period, and measuring the quantities of liquid collected in the measuring vessels 13a and 13b, the ratio of the two branch streams may be accurately determined. From the measuring vessels 13a and 13b the liquid may easily be re-discharged to the tank 10 through the valves 14a and 14b respectively.

In other respects the functioning is substantially the same as in the apparatus shown in Figure 1. The reducing valve 5a serves, like did the reducing valve 5 in Figure 1, to keep the whole converter system a desired pressure, while the check valve 42 serves to control the ratio of the two branch streams and also serves as an expansion valve for the branch stream by-passing the last part of the converter coil and passing direct to the flash chamber 6b. The combination of valves illustrated is preferred to the arrangement of check valve and reducing valve in both branch streams, because it is very difficult to obtain a satisfactory operation of a check valve in series with a reducing valve.

Figure 3:
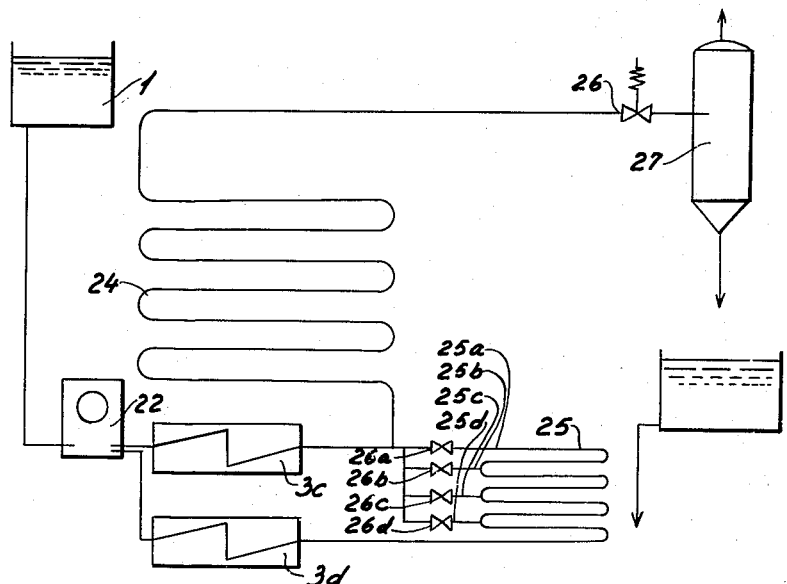

In the example illustrated in Figure 3 the tubular converter system is constructed with two parallel heat exchangers 3c and 3d respectively which are fed from different outlets of a joint pump 22, e.g. from both sides of dual diaphragm pumps. The arrangement is such that the two heat exchangers 3c and 3d are fed at predetermined ratios, which, if so desired may be controllable. The outlet end of the heat exchanger 3c is connected direct to the inlet end of a main converter 24, whereas the outlet end of the other heat exchanger 3d is connected to the inlet end of the main converter through a pre-converter 25, having tapping points 25a–25d which may be connected as preferred to the inlet end of the main converter through valves 26a–26d respectively. In this case, two branch streams are formed at the initial stage of the conversion. The product entering at the inlet end of the main converter is consequently composed of a part which has only passed a heat exchanger, and another part which has passed both a heat exchanger and a pre-converter and is therefore more thoroughly pre-converted than is the first one, in which depending on the time and temperature of the heating process, practically speaking, no conversion has taken place at all. Consequently, the end product will be a mixture of more and less converted liquids also in this case. This liquid is discharged from the outlet end of the converter through a reducing valve 26 to a flash chamber 27.

If a constant ratio is maintained between the two branch streams in the initial part of the converter system, the degree of pre-conversion of one branch stream and thereby the viscosity of the end product may be controlled by changing over between the tapping points 25a–25d. Thus, in this case the control of the reaction conditions of each of the branch streams is not effected by controlling their quantities, but by controlling the relation between the treatments to which they are subjected. Alternatively, the apparatus illustrated in Figure 3 may be operated at a constant length of the pre-converter while the ratio between the two branch streams would be controlled, or these two forms of control may be combined. By employing suitable means of control it may suffice to use a single pump and a single heat exchanger unit. In that case the branching-off of the two branch streams would take place at the outlet end of the heat exchanger.

Also in the systems illustrated in Figures 1 and 2 the control of the quantitative ratio of the two branch streams may be replaced by or combined with a variation of the conditions of conversion to which each is subjected. Thus, in analogy with the pre-converter 25 of Figure 3, the part of the converter 4 of Figure 1 following the tapping points 7—this part being regarded as an after-converter for one branch stream—may be constructed to have a controllable active length. Likewise, if so desired, a variable after-converter may be inserted in the direct flow path from the tapping point 7 to the reducing valve 5.

Figure 4:
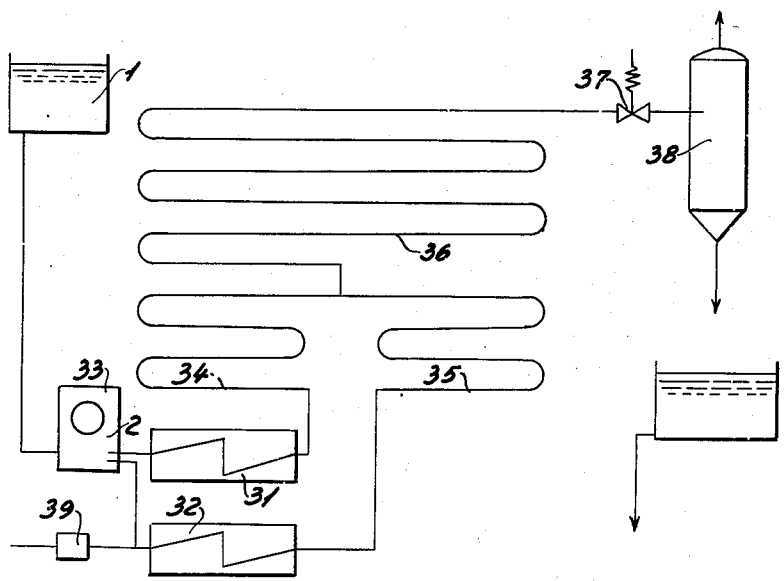
Figure 5:
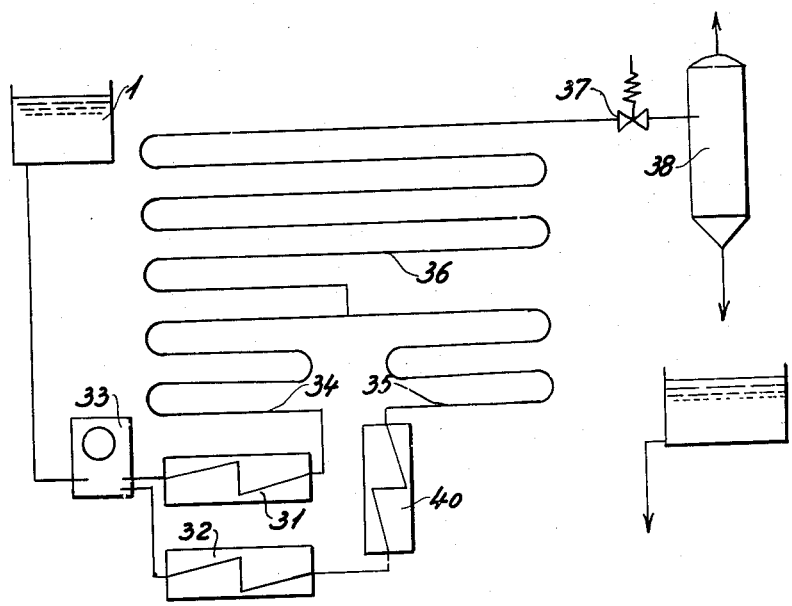

Other methods of obtaining different treatments of branch streams in a controllable manner are illustrated in Figures 4 and 5. In these figures the apparatus is designed, like in Figure 3, with two heat exchangers 31 and 32, which are fed from separate outlets of a pump 33 in such a way that a predetermined, and, if desired, controllable ratio is obtained between the streams through the two heat exchangers 31 and 32. The outlet ends of the two heat exchangers 31 and 32 are connected through individual pre-converters 34 and 35 to the inlet end of a joint after-converter 36. The outlet end of the latter is connected through a reducing valve 37 to a flash chamber 38.

In Figure 4, a dosage pump 39 is connected to the inlet end of the heat exchanger. By means of said pump a controllable quantity of acid or water or a mixture of acid and water may be pumped into the branch stream passing through the heat exchanger 32. Hereby the acidity of the branch stream passing through the heat exchanger 32 and the pre-converter 35 can be made higher or lower than the acidity of the branch stream passing through the heat exchanger 31 and the pre-converter 34, so that in this case the spreading of the end product is obtained by different acidification of the two branch streams. If desired, the ratio of acid and water pumped into the said branch stream can be selected in such a way that the resulting degree of acidity will be the same as in the other branch stream, but the dry-substance content will be lower.

In the system illustrated in Figure 5 an additional controllable heat exchanger 40 is provided between the heat exchanger 32 and the pre-converter 35. By means of this heat exchanger the temperature of the branch stream in question can be increased or possibly decreased so that in this case the temperature is used as the factor of relative control of the two branch streams. A temperature control of the branch streams through the pre-converter 35 may alternatively be obtained by a suitable construction of the heat exchanger 32 intended for this purpose.

The various manners of control described above may be inter-combined as desired.

An apparatus according to the invention may also be built with constant adjustment in order to obtain a product having correlated values of reducing sugars and viscosity. A thing that could not be obtained, or could be obtained only with difficulty, by the conversion of a single stream or by conversion in an existing plant.

It is by no means essential to use an apparatus of the fully continuous type with heat exchangers heated with indirect steam, i.e. without steam injection into the reaction medium. On the contrary, the invention may also be applied, for instance, to plants in which the heating of the starch slurry to the conversion temperature takes place by injection of steam, and is followed by the flowing of the heated medium through a tubular converter, or more generally: to any type of a continuous tubular converter system.

I claim:

1. A process for the production of hydrolyzed starch syrup comprising the steps of subjecting a first continuous stream of hydrolyzable starch medium to heat treatment, subjecting a second continuous stream of hydrolyzable starch medium at a pH-value different from that of said first stream to heat treatment, combining said first and second stream into a single stream and subjecting said combined stream to heat treatment.

2. An apparatus for the production of hydrolyzed starch syrup comprising a first starch slurry heat exchanger and a second starch slurry heat exchanger, both of said exchangers having their inlets connected to a supply of starch slurry, means being provided for separately adjusting the pH-value of the starch slurry supplied to the said two heat exchangers, the outlet of said first heat exchanger being connected through a first pre-converter to the inlet end of a tubular converter, the outlet of said second heat exchanger being connected through a second pre-converter to the inlet of said tubular converter.

References Cited in the file of this patent

UNITED STATES PATENTS

| | | |
|---|---|---|
| 1,927,312 | Hagen | Sept. 19, 1933 |
| 1,928,891 | Hagen | Oct. 3, 1933 |
| 2,233,243 | Burns | Feb. 25, 1941 |
| 2,304,679 | Christensen | Dec. 8, 1942 |
| 2,359,763 | Horesi | Oct. 10, 1944 |